United States Patent
Haugsjaahabink

(10) Patent No.: US 11,808,218 B1
(45) Date of Patent: Nov. 7, 2023

(54) RAPID FUEL SHUTDOWN SYSTEM WITH LATCHING

(71) Applicant: Hamilton Sundstrand Corporation, Charlotte, NC (US)

(72) Inventor: Todd Haugsjaahabink, Springfield, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/730,781

(22) Filed: Apr. 27, 2022

(51) Int. Cl.
    F02C 9/28    (2006.01)
    F02C 9/26    (2006.01)
    F02C 7/236   (2006.01)

(52) U.S. Cl.
    CPC ............... F02C 9/28 (2013.01); F02C 7/236 (2013.01); F02C 9/263 (2013.01); F05D 2270/021 (2013.01); F05D 2270/09 (2013.01); F05D 2270/304 (2013.01)

(58) Field of Classification Search
    CPC .. F02C 7/236; F02C 9/263; F02C 9/28; F02C 7/22; F02C 9/26; F02C 9/44; F02C 9/46; F05D 2270/021
    See application file for complete search history.

(56) References Cited

U.S. PATENT DOCUMENTS

| | | | |
|---|---|---|---|
| 4,010,606 A * | 3/1977 | Hansen | F02C 9/28 415/10 |
| 4,597,407 A | 7/1986 | Smith | |
| 5,315,818 A | 5/1994 | Smith | |
| 6,205,766 B1 * | 3/2001 | Dixon | F02C 9/46 60/39.091 |
| 6,401,446 B1 | 6/2002 | Gibbons | |
| 6,751,942 B2 | 6/2004 | Mahoney et al. | |
| 7,827,796 B2 * | 11/2010 | Jones | F02C 7/232 60/734 |
| 8,366,404 B2 * | 2/2013 | Griffiths | F02C 9/46 60/734 |
| 8,991,186 B2 | 3/2015 | Bickley et al. | |
| 9,771,906 B2 | 9/2017 | Henson | |
| 10,317,082 B2 | 6/2019 | McBrien | |
| 10,968,832 B2 | 4/2021 | Portolese et al. | |
| 2004/0117102 A1 * | 6/2004 | Weir | F02C 9/263 701/1 |
| 2007/0113559 A1 * | 5/2007 | Zagranski | F02C 9/46 60/773 |
| 2008/0067463 A1 * | 3/2008 | Jones | F02C 7/232 251/208 |

(Continued)

FOREIGN PATENT DOCUMENTS

GB    2088962 A    6/1982

*Primary Examiner* — Alain Chau
(74) *Attorney, Agent, or Firm* — CANTOR COLBURN LLP

(57) ABSTRACT

A fuel flow system for a gas turbine engine includes a fuel inlet to admit a flow of fuel into the fuel flow system and a fuel outlet to direct the flow of fuel to the gas turbine engine from the fuel flow system. One or more pumps are positioned along a fuel flow path connecting the fuel inlet to the fuel outlet. A metering valve is in flow communication with the one or more pumps to meter the flow of fuel. A minimum pressure shut-off valve is fluidly connected to the one or more pumps, and a shutoff apparatus configured to permit selective energizing to stop the flow of fuel from the fuel outlet without operation of the metering valve.

18 Claims, 2 Drawing Sheets

(56) References Cited

U.S. PATENT DOCUMENTS

| | | | |
|---|---|---|---|
| 2010/0158707 A1* | 6/2010 | Griffiths | F02C 9/46 417/222.1 |
| 2015/0027412 A1* | 1/2015 | Henson | F02M 45/12 123/457 |
| 2017/0306790 A1* | 10/2017 | Coretto | F01D 21/02 |
| 2020/0378315 A1* | 12/2020 | Reuter | F02C 7/236 |

* cited by examiner

RAPID FUEL SHUTDOWN SYSTEM WITH LATCHING

BACKGROUND

Exemplary embodiments pertain to the art of gas turbine engines, and more particularly to fuel systems for gas turbine engines.

Fuel systems are configured to provide a metered flow of fuel to the gas turbine engine for use at the combustor of the gas turbine engine. In some conditions, such as when an engine overspeed (EOS) event occurs, it is desired to stop the flow of fuel to the gas turbine engine to stop operation of the gas turbine engine. Further, it is desired to stop the flow of fuel quickly, to prevent potential damage to the gas turbine engine.

BRIEF DESCRIPTION

In one embodiment, a fuel flow system for a gas turbine engine includes a fuel inlet to admit a flow of fuel into the fuel flow system and a fuel outlet to direct the flow of fuel to the gas turbine engine from the fuel flow system. One or more pumps are positioned along a fuel flow path connecting the fuel inlet to the fuel outlet. A metering valve is in flow communication with the one or more pumps to meter the flow of fuel. A minimum pressure shut-off valve is fluidly connected to the one or more pumps, and a shutoff apparatus configured to permit selective energizing to stop the flow of fuel from the fuel outlet without operation of the metering valve.

Additionally or alternatively, in this or other embodiments the shutoff apparatus includes an engine overspeed electro-mechanical interface device, and an engine overspeed valve operably connected to the engine overspeed electro-mechanical interface device. The engine overspeed electro-mechanical interface device is selectably energized to pressurize fluid to operate the engine overspeed valve via pressurization of the fluid. A pressurized fluid is directed from the engine overspeed valve to the minimum pressure shut-off valve to operate the minimum pressure shut-off valve and stop the flow of fuel from the fuel outlet.

Additionally or alternatively, in this or other embodiments the engine overspeed electro-mechanical interface device is selectably energized in response to one or more engine operating conditions.

Additionally or alternatively, in this or other embodiments the one or more engine operating conditions includes an engine overspeed condition.

Additionally or alternatively, in this or other embodiments the shut-off apparatus is configured to continue stopping the flow of fuel when the shut-off apparatus is de-energized.

Additionally or alternatively, in this or other embodiments the shut-off apparatus is de-activated via movement of the metering valve to a shut-off stop position.

Additionally or alternatively, in this or other embodiments a pressure regulating valve is fluidly connected to the one or more pumps.

Additionally or alternatively, in this or other embodiments a latching orifice is located along a fluid pathway between the pressure regulating valve and the engine overspeed valve.

Additionally or alternatively, in this or other embodiments the one or more pumps includes a centrifugal pump and a positive displacement pump.

Additionally or alternatively, in this or other embodiments the pressure regulating valve is located along a fuel pathway between the positive displacement pump and the metering valve.

In another embodiment, a method of operating a fuel flow system for a gas turbine engine includes urging a flow of fuel along a fuel flowpath connecting a fuel inlet and a fuel outlet via one or more pumps and directing the flow of fuel through a metering valve in flow communication with the one or more pumps to meter the flow of fuel. The flow of fuel is directed through a minimum pressure shut-off valve fluidly connected to the one or more pumps. A shutoff apparatus is selectably operated to stop the flow of fuel from the fuel outlet without operation of the metering valve.

Additionally or alternatively, in this or other embodiments operating the shutoff apparatus includes selectably energizing an engine overspeed electro-mechanical interface device, pressurizing a fluid via operation of the overspeed electro-mechanical interface device, operating an engine overspeed valve via pressurization of the fluid, and directing a pressurized fluid from the engine overspeed valve to the minimum pressure shut-off valve to operate the minimum pressure shut-off valve and stop the flow of fuel from the fuel outlet.

Additionally or alternatively, in this or other embodiments the engine overspeed electro-mechanical interface device is selectably energized in response to one or more engine operating conditions.

Additionally or alternatively, in this or other embodiments the one or more engine operating conditions includes an engine overspeed condition.

Additionally or alternatively, in this or other embodiments the shut-off apparatus is configured to continue stopping the flow of fuel when the shut-off apparatus is de-energized.

Additionally or alternatively, in this or other embodiments the shut-off apparatus is de-energized via movement of the metering valve to a shut-off stop position.

Additionally or alternatively, in this or other embodiments a pressure regulating valve is fluidly connected to the one or more pumps.

Additionally or alternatively, in this or other embodiments a latching orifice is located along a fluid pathway between the pressure regulating valve and the engine overspeed valve.

Additionally or alternatively, in this or other embodiments the one or more pumps includes a centrifugal pump and a positive displacement pump.

Additionally or alternatively, in this or other embodiments the pressure regulating valve is located along a fuel pathway between the positive displacement pump and the metering valve.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
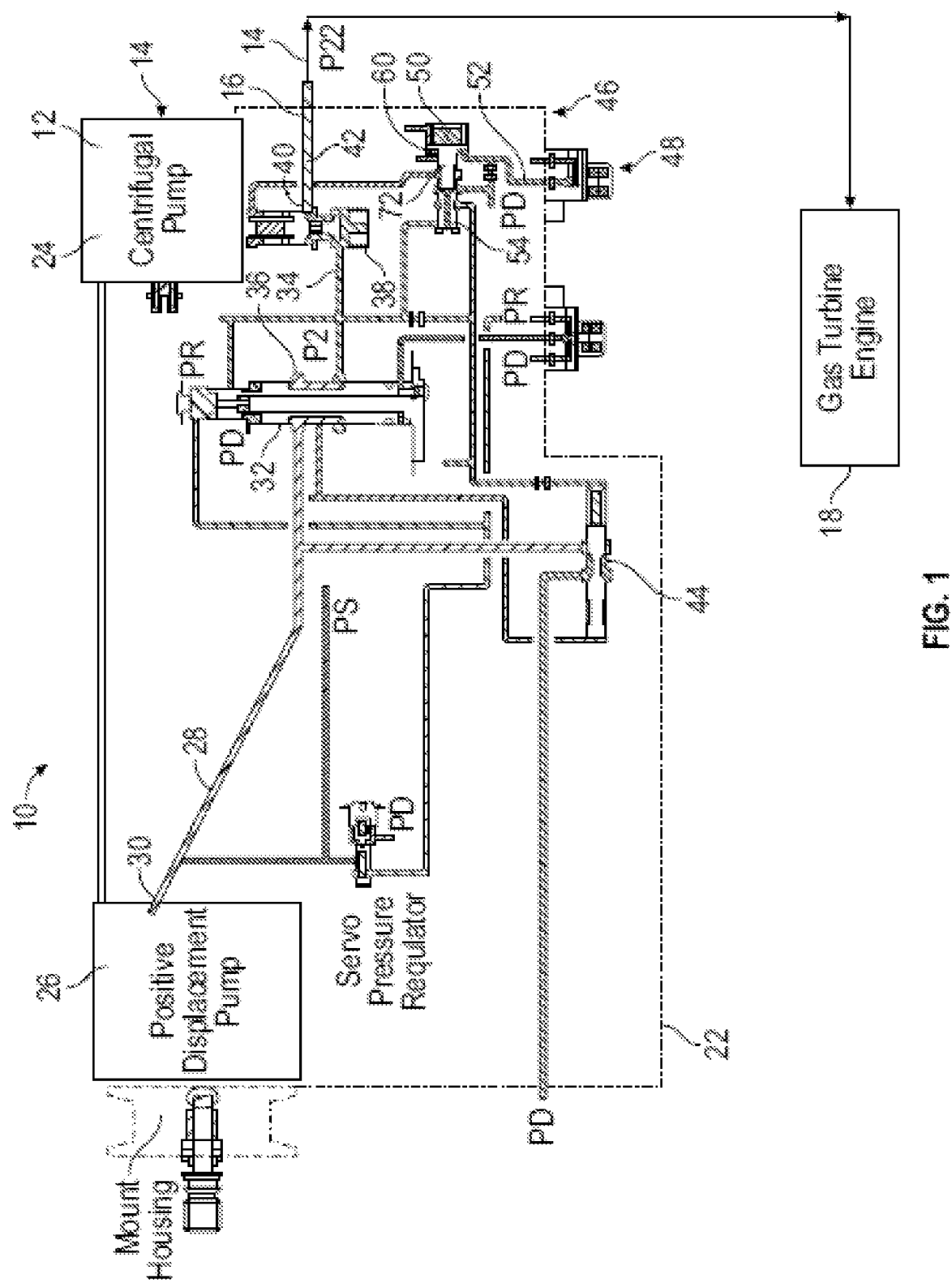
FIG. 1 is a schematic illustration of an embodiment of a fuel flow system for a gas turbine engine.

Shown in FIG. 1 is a schematic view of an embodiment of fuel flow system 10. The fuel flow system 10 generally includes a fuel inlet 12 through which a flow of fuel 14 enters the fuel flow system 10 and a fuel outlet 16 through which a metered flow of fuel 14 is selectably directed to a gas turbine engine 18. As described further herein a plurality of pumps, valves and other components are arranged along a fuel flow path in the fuel flow system 10 to regulate the flow of fuel 14 exiting the fuel flow system 10 at the fuel outlet 16. In some embodiments, the components are disposed in a common housing 22.

The fuel flow system 10 includes a centrifugal boost pump 24. The centrifugal boost pump 24 boost the pressure of the flow of fuel 14 that enters the fuel inlet 12. A positive displacement (PD) pump 26 receives the flow of fuel 14 from the centrifugal boost pump 24 at a low pressure ($P_D$) and urges the flow of fuel 14 through the fuel flow system 10. A first fuel line 28 connects a pump outlet 30 of the PD pump 26 at a high supply pressure ($P_S$) to a metering valve 32, and a second fuel line 34 connects a metering valve outlet 36 to a minimum pressure shut off valve (MPSOV) 38. An MPSOV outlet 40 is connected to the fuel outlet 16 via a third fuel line 42. In some embodiments, a pressure regulating valve (PRV) 44 is located along the first fuel line 28. When the fuel flow system 10 is operated in run mode as shown in FIG. 1, the flow of fuel 14 is urged from the PD pump 26, through the metering valve 32, through the MPSOV 38, and out of the fuel outlet 16 to the gas turbine engine 18. Excess fuel pressure in the flow of fuel is dissipated at the PRV 44.

The metering valve 32, the MPSOV 38 and the PRV 44 are hydraulically controlled and are connected to an engine overspeed (EOS) shutoff apparatus 46. The EOS shutoff apparatus 46 includes an engine overspeed electro-mechanical interface device (EOSID) 48 and an engine overspeed valve (EOSV) 50 fluidly connected to the EOSID 48 via a signal line 52. In some embodiments, the EOSID 48 is a dual coil torque motor. Additionally, in some embodiments, the EOSV 50 is a two-diameter EOSV 50. When the fuel flow system 10 is operated in the run mode, the EOSID 48 is deenergized, and thus the EOS shutoff apparatus 46 is not operated. In the run mode, the EOSV 50 includes a EOSV spring 54 which biases the EOSV 50 into a run position as shown in FIG. 1.

Figure 2:
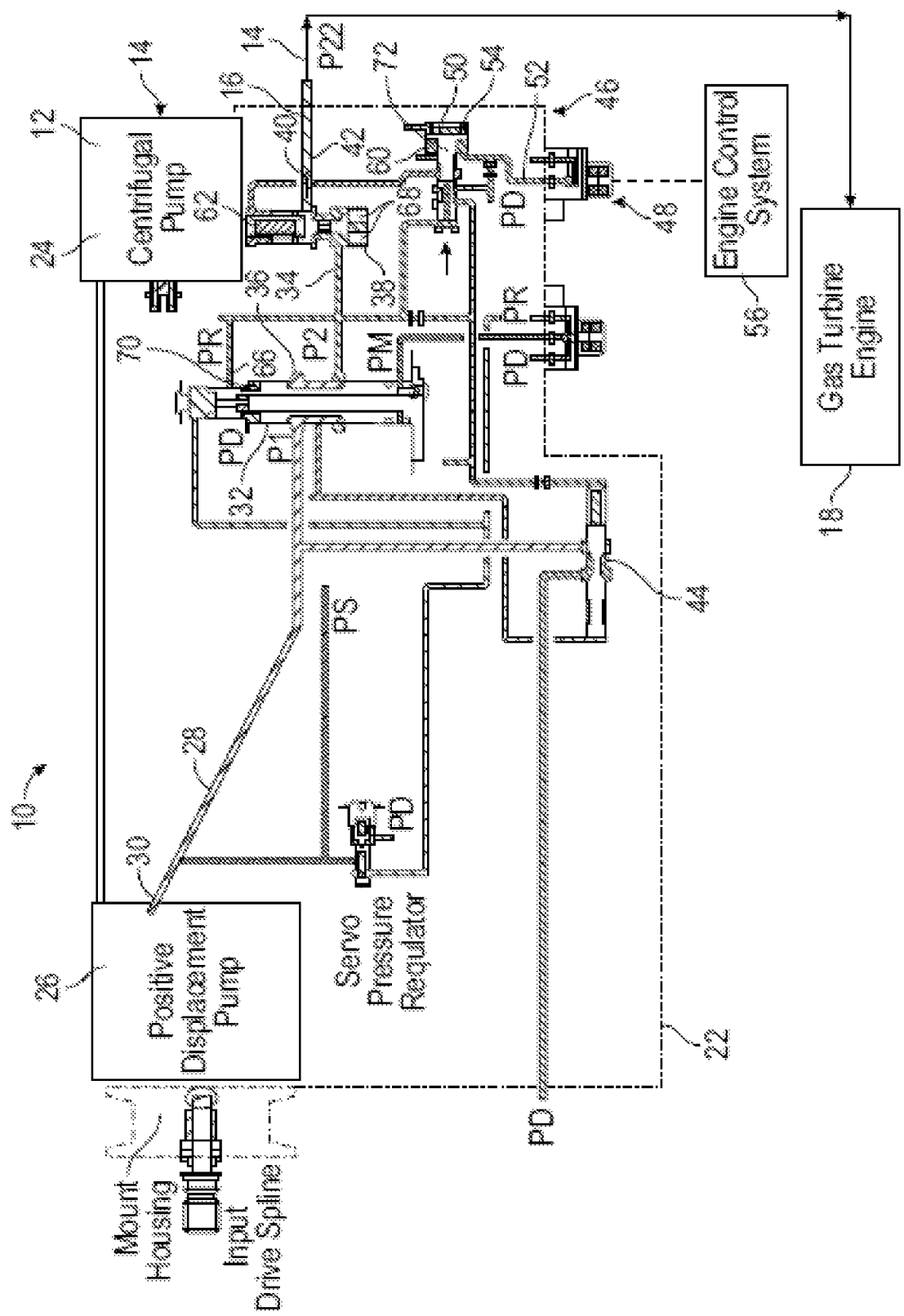
FIG. 2 is a schematic illustration of an embodiment of a fuel flow system for a gas turbine engine in a shutdown mode.

Referring now to FIG. 2, when an engine operating condition such as, for example, EOS, is detected, an engine control system 56, such as a full authority digital engine control (FADEC), energizes the EOSID 48, this initiating a shutdown of the fuel flow system 10. When the shutdown mode is initiated, the EOSID 48 is energized, thus connecting $P_S$ to the hydraulic fluid line 52 connecting the EOSID 48 and the EOSV 50. This increases the hydraulic pressure at a first land 60 of the EOSV 50. This pressure increase overcomes the bias of the EOSV spring 54, and moves an EOSV piston 72 from the run position to a shutdown position. Moving the EOSV piston 72 to the shutdown position ports hydraulic fluid at $P_S$ to a backside 62 of the MPSOV 38, causing the MPSOV 38 to close, thus preventing the flow of fuel 14 from proceeding through the MPSOV 38. Further, the EOSV 50 in the shutdown position ports PRV 44 backside pressure ($P_{PRV}$) to boost discharge ($P_D$). This drives the PRV 44 into full bypass position, preventing PD pump flow from becoming dead-headed and raising $P_S$ to an unsafe level. Thus, the flow of fuel 14 to the gas turbine engine 18 is stopped independent of operation of the metering valve 32.

Additionally, the EOSV 50 latches hydraulically in the shutdown position by switching a second land of the EOSV 50 from $P_D$ hydraulic pressure to a metering valve 32 downstream pressure ($P_2$) which will hold the EOSV 50 in the latched position even when power is removed from the EOSID 48. An EOS latching orifice 64 separates $P_2$ from Pprv, and while the EOSV 50 is in the shutdown position, the metering valve 32 remains open, $P_2$ remains high enough to hold the EOSV 50 in the shutdown position, despite Pprv being ported to $P_D$. In order to un-latch the EOSV 50 and enable the flow of fuel 14 to be reinstated, the metering valve 32 must be brought to its shut-off stop 70, or fully closed position, where a shut-off port 66 of the metering valve 32 dumps $P_2$ to $P_D$, thus allowing the EOSV spring 54 to move the EOSV 50 back to the run position. A metered flow of fuel 14 can then be turned back on by moving the metering valve 32 from the shut-off stop.

Additionally, health of the EOS shutoff apparatus 46 can be verified at every shutdown of the gas turbine engine 18 with the following check. When the pilot commands an engine shutdown, the engine control system 56 will first energize the EOSID 48, which will close the MPSOV 38, stopping the flow of fuel 14 to the gas turbine engine 18. An EOSID 48 channel used can be switched every shutdown to ensure even coverage and health verification. Closure of the MPSOV 38 may be positively verified by check of a proximity transducer 68 of the MPSOV 38. Then the engine control system 56 will move the metering valve 32 to the shut-off stop 70 and the EOSID 48 is de-powered. With the metering valve 32 holding the fuel flow system 10 in shutdown mode, it will remain so while the gas turbine engine 18 spools down and until the subsequent engine spool-up for start, where metered flow of fuel 14 can be turned on by moving the metering valve 32 off the shut-off stop 70.

The system 10 described herein allows for rapid shutdown of the flow of fuel 14 sent to the gas turbine engine 18 in the case of, for example, an EOS event. Further, the system 10 remains latched in the shutdown mode even when the EOSID 48 is depowered. The latch is removed when the metering valve 32 is brought to its fully closed position, and the flow of fuel 14 may then be resumed once the metering valve 32 is brought to its run mode.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fuel flow system for a gas turbine engine, comprising:
    a fuel inlet to admit a flow of fuel into the fuel flow system;
    a fuel outlet to direct the flow of fuel to the gas turbine engine from the fuel flow system;
    one or more pumps disposed along a fuel flow path connecting the fuel inlet to the fuel outlet;
    a metering valve in flow communication with the one or more pumps to meter the flow of fuel;
    a minimum pressure shut-off valve fluidly connected to the one or more pumps; and
    a shutoff apparatus configured to permit selective energizing to stop the flow of fuel from the fuel outlet without operation of the metering valve;
    wherein the shutoff apparatus includes an engine overspeed valve operably connected to the minimum pressure shut-off valve to selectably stop the flow of fuel from the fuel outlet; and
    wherein the engine overspeed shutoff valve is configured to hydraulically latch in a shutdown position to maintain the stoppage of the flow of fuel when the shutoff apparatus is deenergized.

2. The fuel flow system of claim 1, wherein the shutoff apparatus further includes:
    an engine overspeed electro-mechanical interface device;
    wherein the engine overspeed electro-mechanical interface device is selectably energized to pressurize fluid to operate the engine overspeed valve via pressurization of the fluid; and
    wherein a pressurized fluid is directed from the engine overspeed valve to the minimum pressure shut-off valve to operate the minimum pressure shut-off valve and stop the flow of fuel from the fuel outlet.

3. The fuel flow system of claim 2, wherein the engine overspeed electro-mechanical interface device is selectably energized in response to one or more engine operating conditions.

4. The fuel flow system of claim 3, wherein the one or more engine operating conditions includes an engine overspeed condition.

5. The fuel flow system of claim 1, wherein the shut-off apparatus is de-activated via movement of the metering valve to a shut-off stop position.

6. The fuel flow system of claim 1, further comprising a pressure regulating valve fluidly connected to the one or more pumps.

7. The fuel flow system of claim 6, further comprising a latching orifice disposed along a fluid pathway between the pressure regulating valve and the engine overspeed valve.

8. The fuel flow system of claim 1, wherein the one or more pumps includes a centrifugal pump and a positive displacement pump.

9. The fuel flow system of claim 6, wherein the pressure regulating valve is disposed along a fuel pathway between a pump of the one or more pumps and the metering valve.

10. A method of operating a fuel flow system for a gas turbine engine, comprising:
    urging a flow of fuel along a fuel flowpath connecting a fuel inlet and a fuel outlet via one or more pumps;
    directing the flow of fuel through a metering valve in flow communication with the one or more pumps to meter the flow of fuel;
    directing the flow of fuel through a minimum pressure shut-off valve fluidly connected to the one or more pumps; and
    selectably operating a shutoff apparatus to stop the flow of fuel from the fuel outlet without operation of the metering valve;
    wherein the shutoff apparatus includes an engine overspeed valve operably connected to the minimum pressure shut-off valve to selectably stop the flow of fuel from the fuel outlet; and
    wherein the engine overspeed shutoff valve hydraulically latches in a shutdown position to maintain the stoppage of the flow of fuel when the shutoff apparatus is deenergized.

11. The method of claim 10, wherein operating the shutoff apparatus includes:
    selectably energizing an engine overspeed electro-mechanical interface device;
    pressurizing a fluid via operation of the overspeed electro-mechanical interface device;
    operating the engine overspeed valve via pressurization of the fluid; and
    directing a pressurized fluid from the engine overspeed valve to the minimum pressure shut-off valve to operate the minimum pressure shut-off valve and stop the flow of fuel from the fuel outlet.

12. The method of claim 11, wherein the engine overspeed electro-mechanical interface device is selectably energized in response to one or more engine operating conditions.

13. The method of claim 12, wherein the one or more engine operating conditions includes an engine overspeed condition.

14. The method of claim 10, further comprising de-activating the shut-off apparatus via movement of the metering valve to a shut-off stop position.

15. The method of claim 10, wherein a pressure regulating valve is fluidly connected to the one or more pumps.

16. The method of claim 15, further comprising a latching orifice disposed along a fluid pathway between the pressure regulating valve and the engine overspeed valve.

17. The method of claim 10, wherein the one or more pumps includes a centrifugal pump and a positive displacement pump.

18. The method of claim 10, wherein the pressure regulating valve is disposed along a fuel pathway between a pump of the one or more pumps and the metering valve.

* * * * *